(12) United States Patent
Yao

(10) Patent No.: US 11,220,087 B2
(45) Date of Patent: Jan. 11, 2022

(54) CUTTING METHOD FOR ELASTIC MEMBRANE MATERIAL AND ELASTIC FILAMENT

(71) Applicant: CHANCE LINE INDUSTRIAL CO., LTD., Siansi Township (TW)

(72) Inventor: Ming-Hsien Yao, Siansi Township (TW)

(73) Assignee: CHANCE LINE INDUSTRIAL CO., LTD., Siansi Township (TW)

( * ) Notice: Subject to any disclaimer, the term of this patent is extended or adjusted under 35 U.S.C. 154(b) by 0 days.

(21) Appl. No.: 16/906,539

(22) Filed: Jun. 19, 2020

(65) Prior Publication Data

US 2020/0398527 A1 Dec. 24, 2020

(30) Foreign Application Priority Data

Jun. 21, 2019 (TW) .................. 108121685

(51) Int. Cl.
*B32B 27/12* (2006.01)
*B32B 7/022* (2019.01)
(Continued)

(52) U.S. Cl.
CPC .............. *B32B 7/022* (2019.01); *B32B 5/024* (2013.01); *B32B 5/16* (2013.01); *B32B 7/023* (2019.01);
(Continued)

(58) Field of Classification Search
CPC ...... B32B 2307/302; B32B 2307/4026; B32B 2307/416; B32B 2307/422;
(Continued)

(56) References Cited

U.S. PATENT DOCUMENTS 1,963,813 A 6/1934 Van Voorhis
2,120,721 A 6/1938 Spanel
(Continued)

FOREIGN PATENT DOCUMENTS

AU 8665382 A 2/1983
GB 503503 A 4/1939
(Continued)

*Primary Examiner* — Lawrence D Ferguson
(74) *Attorney, Agent, or Firm* — Guice Patents PLLC

(57) ABSTRACT

A cutting method for an elastic membrane material and an elastic filament manufactured with the cutting method. The cutting method includes: preparing an elastic membrane material with flexibility; temporarily bonding the elastic membrane material with a cushion layer to form a semi-finished membrane material and supporting the elastic membrane material by the cushion layer; pulling the semi-finished membrane material continuously, and cutting the elastic membrane material into a plurality of filaments with a cutting device during the pulling process; and separating the cut filaments from the cushion layer, the separated filament being the elastic filament, and the elastic filament can be made into an elastic filament with functionality and special appearance. A fabric woven with the elastic filament has the effects of softness, close-fitting, excellent tactile impression and flexible. A functional layer can be provided on a surface of the elastic filament to make the elastic filament to have luminescent, reflective or conductive function.

16 Claims, 15 Drawing Sheets

(51) Int. Cl.
*B32B 7/023* (2019.01)
*B32B 5/02* (2006.01)
*B32B 5/16* (2006.01)
*B32B 7/06* (2019.01)
*B32B 25/02* (2006.01)

(52) U.S. Cl.
CPC ............ *B32B 7/06* (2013.01); *B32B 25/02* (2013.01); *B32B 27/12* (2013.01); *B32B 2307/302* (2013.01); *B32B 2307/4026* (2013.01); *B32B 2307/416* (2013.01); *B32B 2307/422* (2013.01); *B32B 2307/51* (2013.01); *B32B 2307/714* (2013.01); *B32B 2311/04* (2013.01); *B32B 2311/08* (2013.01); *B32B 2311/12* (2013.01); *B32B 2311/16* (2013.01); *B32B 2311/24* (2013.01)

(58) Field of Classification Search
CPC ......... B32B 2307/51; B32B 2307/714; B32B 2311/04; B32B 2311/08; B32B 2311/12; B32B 2311/16; B32B 2311/24; B32B 25/02; B32B 27/12; B32B 5/024; B32B 5/16; B32B 7/022; B32B 7/023; B32B 7/06; D02G 3/32
See application file for complete search history.

(56) References Cited

U.S. PATENT DOCUMENTS

| | | |
|---|---|---|
| 2,427,334 A | 9/1947 | Alderfer |
| 4,336,092 A | 6/1982 | Wasserman |
| 2007/0042179 A1* | 2/2007 | Karayianni ............ D02G 3/441 428/375 |

FOREIGN PATENT DOCUMENTS

| | | |
|---|---|---|
| JP | 50-007181 | 3/1975 |
| JP | S62-130850 | 6/1987 |
| JP | H11-151782 | 6/1999 |
| JP | 2004-181009 | 7/2004 |
| JP | 2009-270218 | 11/2009 |

* cited by examiner

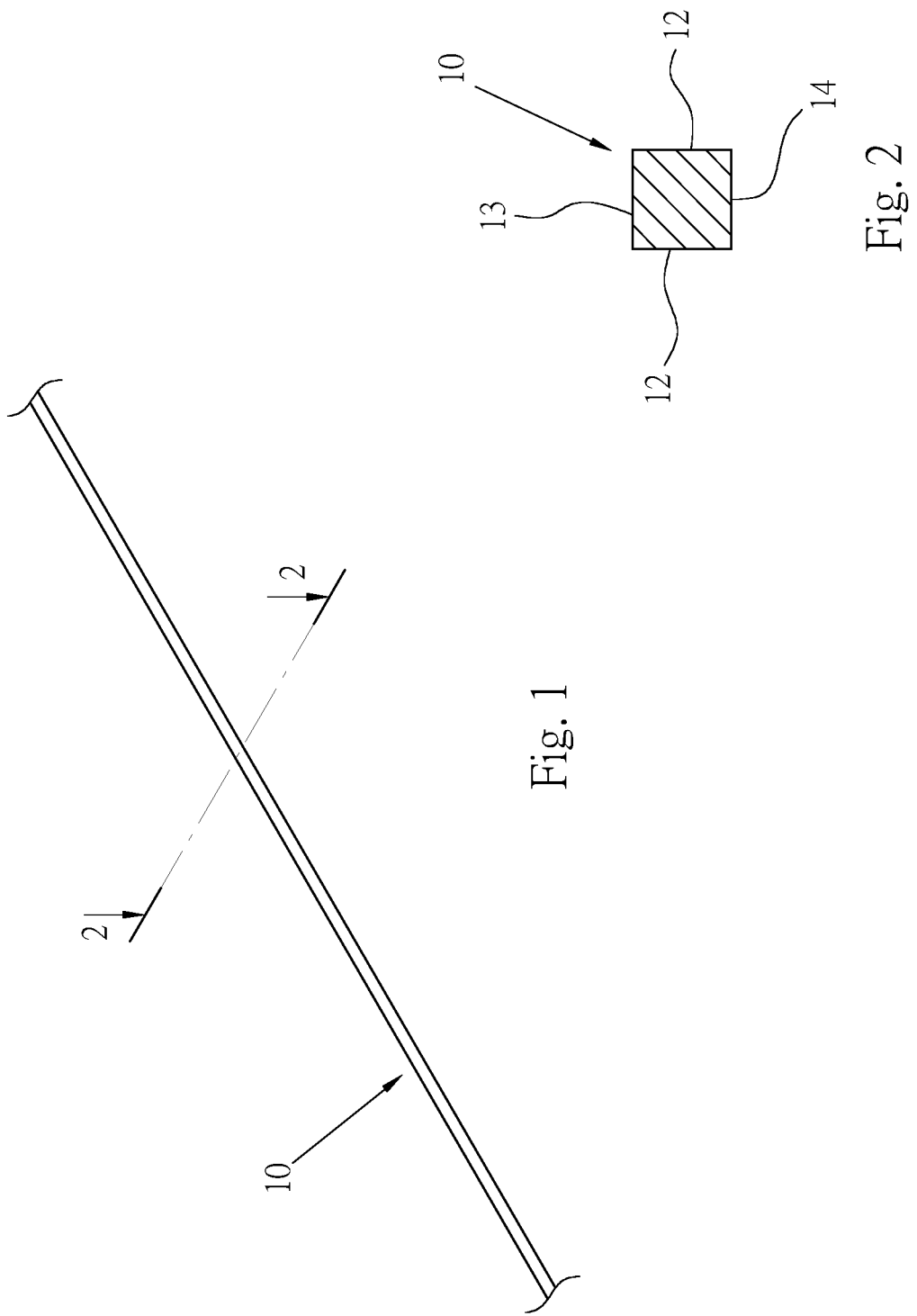

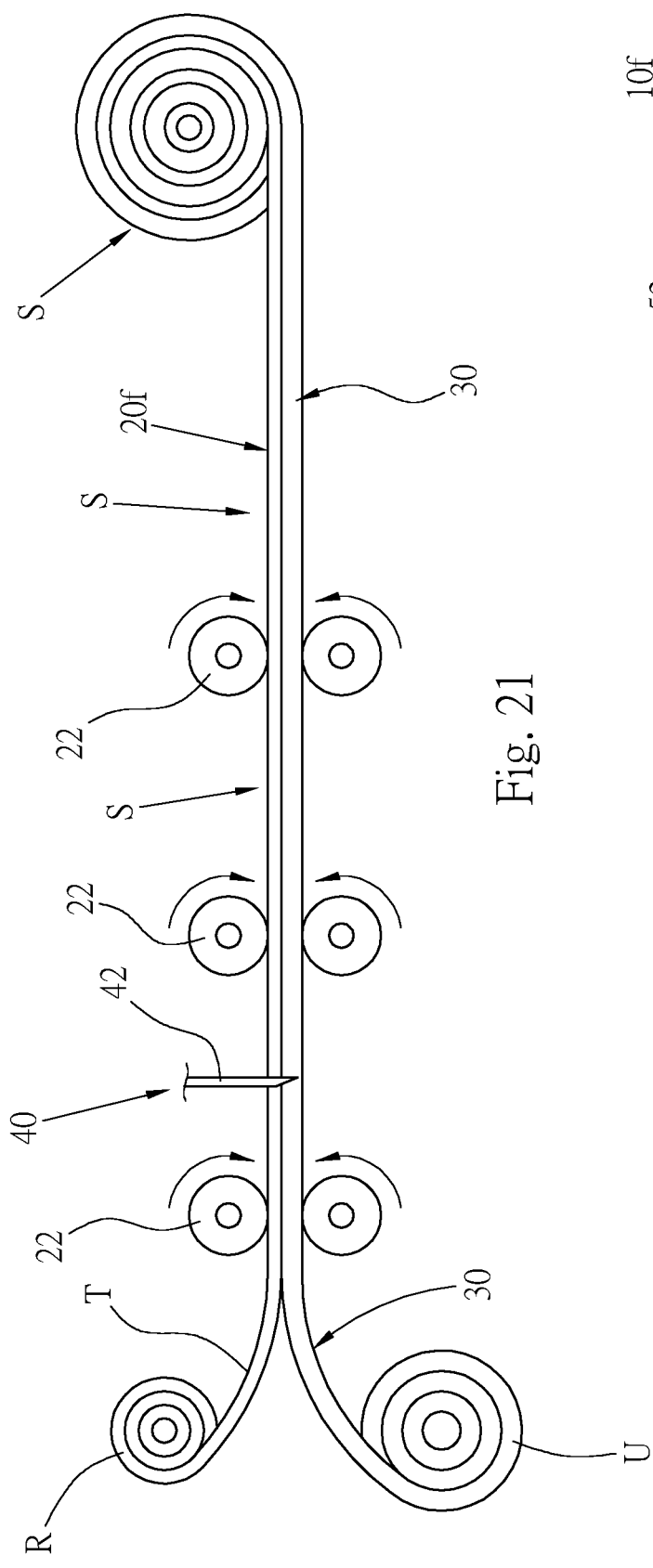
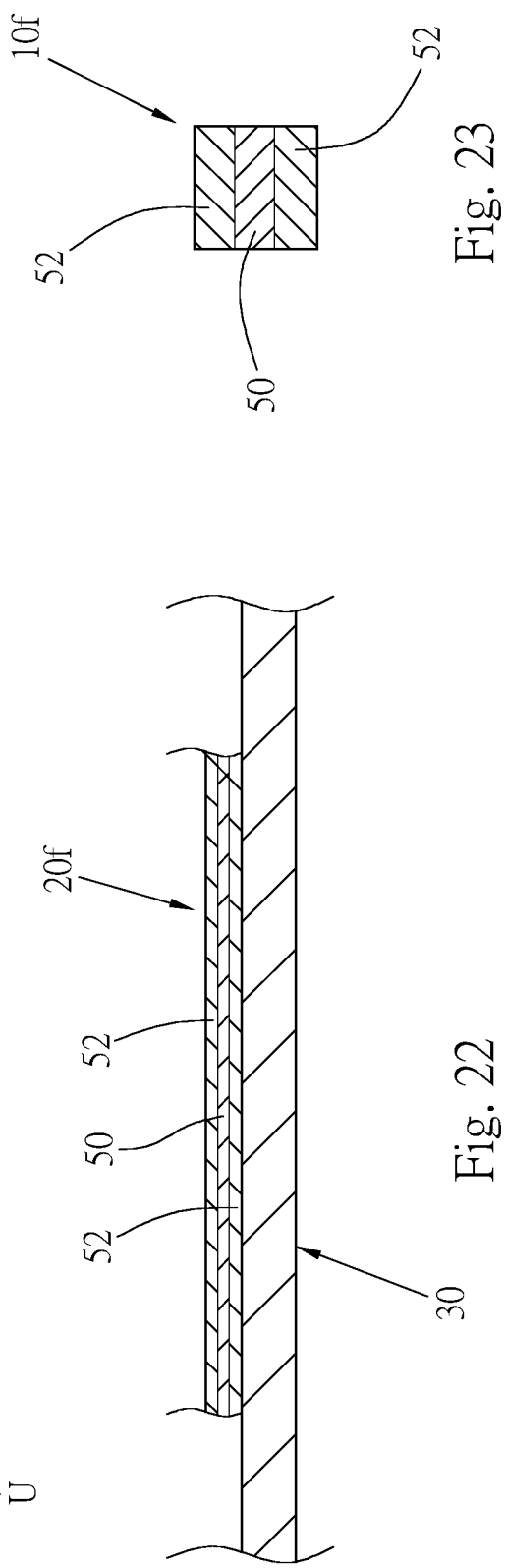
Fig. 21
Fig. 22
Fig. 23

CUTTING METHOD FOR ELASTIC MEMBRANE MATERIAL AND ELASTIC FILAMENT

BACKGROUND OF THE INVENTION

Field of Invention

The present invention relates to an elastic filament made of high polymer material and a method for manufacturing the elastic filament to cause the elastic filament to have functional effect and special appearance.

Related Art

Fagoting is a traditional method for manufacturing elastic filament that is used in apparel. Elastic filament made by fagoting has a circular cross-section and has no other function except flexibility.

Yarn made of membrane material by the current technology has a certain rigidity, and lacks flexibility and softness, and fabric made of yarns formed by cutting into filaments is not comfortable and soft in texture and wearing. The currently existing yarn is a filament cut from a PET polyester membrane material, this type of membrane material is quite hard and is the same material as that of mineral water bottle. For the currently existing reflective yarn, if it is a double-sided reflector, a layer of PET membrane is bonded between two layers of reflective membrane, and then cut into yarns; and if it is a single-sided reflector, a layer of PET membrane is bonded on the back side of one layer of reflective membrane, and then cut into yarns. The reason why the existing membrane material can be cut into yarns is because of the rigidity of PET membrane material to enable cutting. The membrane material cannot be cut if there is no PET component. Since the current technical skill for cutting membrane material into filaments is incapable of cutting soft materials, the currently existing yarns made by cutting a membrane material have a considerable hardness.

Due to the obstacles of the filament-cutting technique, the membrane materials that can be used are restricted, resulting in the failure of the existing yarns to achieve effects of functionality and special appearance. If the membrane material with functionality and special appearance effects can be made into yarns or filaments with flexibility, a fabric woven with the elastic yarns or filaments can have considerable softness and flexibility. However, according to the current technique, it is still impossible to cut the elastic membrane materials with functionality or special appearance into elastic filaments.

However, if elastic yarns or filaments that can be woven are to be made by cutting, such yarns and filaments must be cut from an elastic membrane material that has a considerable length and considerable thin thickness, and that has special functions, and cut the membrane material into thin yarns or filaments. However, the inventor of the present invention conducted a market inspection and asked the manufacturers who cut membrane materials into filaments if there is a way to cut the membranous, soft and elastic membrane material into filaments, and found that the current technique is incapable of achieving the task, and found that there are several main reasons. Firstly, due to the elasticity and softness of the elastic membrane material, it is easy to deform and flex, and it is easy for the cutter to fail to cut the elastic membrane material with certainty, causing the cut filaments to be thick and thin, and jagged, and the edges of the filaments are uneven. The greater the elasticity and toughness of the elastic membrane material, the more difficult the cutter being capable of cutting off the elastic membrane material. If multiple cutters are used to cut one sheet of elastic membrane material into filaments at the same time, and if one of the cutters does not cut off the elastic membrane material, it will become a defective product, and the elastic membrane material must be scrapped. Moreover, the soft elastic membrane material is likely to be corrugated, so that during cutting, part of its material will be stacked on top of each other, which affects the implementation of cutting and is easy to form defective products.

Secondly, when pulling/dragging the elastic membrane material with flexibility, due to the flexibility, the stretching condition and tension of each part of the membrane material will be uneven. For example, at a position with an excessive tension, the cut filament will be corrugated, and at a position with an tension that is too small, the cut filament will be wavy, and due to the uneven tension, the cut filaments will have different thicknesses, resulting in poor quality. Thirdly, because the stretching condition is uneven and a width of the filament to be cut is small, it is easy to cut off the filament at positions before it reaches a full length intended to be cut, which also becomes a defective product and reduces the yield.

Due to the above disclosed reasons, there is no technique or method available on the market that is capable of making elastic filaments by pulling/dragging and cutting the elastic membrane material, or capable of making elastic filaments with luminescent and reflective effects or with metallic texture and conductive effects.

SUMMARY OF THE INVENTION

An object of the present invention is to provide a soft and elastic filament with flexibility, and a fabric made of the elastic filament is soft, and has excellent tactile impression and flexibility.

Another object of the present invention is to provide an elastic filament made of high polymer material, so that the elastic filament has luminescent, reflective or metallic texture effect.

Yet another object of the present invention is to provide an elastic filament made of high polymer material and having a conductive material with conductive function capable of storing solar energy as electrical energy.

Still another object of the present invention is to provide a cutting method for an elastic membrane material to make the elastic filament by cutting a continuously fed elastic membrane material.

The present invention provides a cutting method for an elastic membrane material to make the elastic filament from a continuously fed elastic membrane material, and the cutting method includes the following processes:

preparing an elastic membrane material with stretched flexibility;

temporarily bonding the elastic membrane material with a cushion layer to form a semi-finished membrane material, a ductility and a flexibility of the cushion layer being lower than that of the elastic membrane material;

continuously pulling the semi-finished membrane material, and during the pulling process, continuously cutting the elastic membrane material with a cutting device into a plurality of filaments; and separating the cut filaments from the cushion layer, and the filament obtained after separation being the elastic filament.

The elastic filament provided by the present invention is a thin filament made of high polymer material and having stretchable elasticity, a cross section of the elastic filament is rectangular, and a pair of opposite sides are planes formed by cutting.

Thereby, the present invention is capable of manufacturing the elastic filament by cutting, and a fabric woven with the elastic filament has effects of softness, close-fitting, excellent tactile impression and excellent flexibility.

Preferably, the elastic filament has a successive length, and a width of the elastic filament is 0.09~3 mm.

Preferably, the elastic filament and the elastic membrane material have: a base layer made of high polymer material and having stretchable elasticity; and at least one functional layer provided on at least one surface of the base layer, the functional layer can be a luminescent layer, so that the elastic filament is capable of emitting luminescence. The functional layer can be a reflective layer, so that the elastic filament is capable of reflecting light. The functional layer can be a conductive slurry coating, so that a fabric made of the elastic filament is capable of converting solar energy into electrical energy.

Preferably, inside the base layer of the elastic filament and the elastic membrane material has a dye or pigment to change an appearance color of the elastic filament with luminescent function.

Preferably, at least one surface of the base layer of the elastic filament and the elastic membrane material is provided with at least one color layer to change an appearance color of the elastic filament with luminescent function.

Preferably, a metal powder is added in the elastic filament and the elastic membrane material, so that an appearance of the elastic filament has a metallic texture.

BRIEF DESCRIPTION OF THE DRAWINGS

The objects, features and achieved efficacies of the present invention can be understood from the description and figures of the following preferred embodiments, wherein:

FIG. 1 is a perspective view of an elastic filament of a preferred embodiment of the present invention;

FIG. 2 is an enlarged cross-sectional view taken along section line 2-2 in FIG. 1.

FIG. 21 is a schematic diagram of a manufacturing process for cutting the elastic membrane material of a tenth preferred embodiment of the present invention;

FIG. 22 is a partial enlarged view of the elastic membrane material and a cushion layer of FIG. 21;

FIG. 23 is a cross-sectional view of the elastic filament of a tenth preferred embodiment of the present invention;

DETAILED DESCRIPTION OF THE INVENTION

Figure 3:
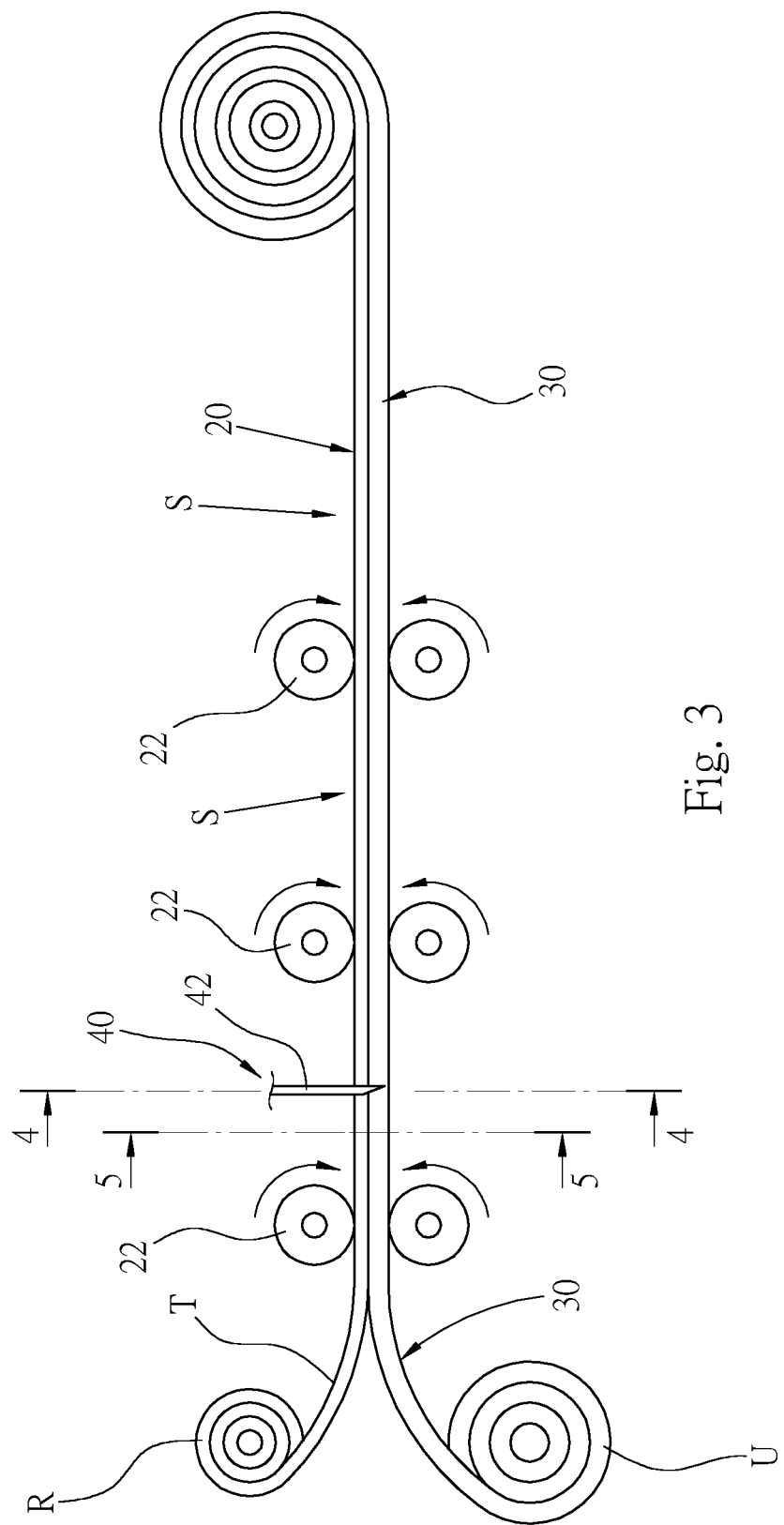
FIG. 3 is a schematic diagram of a manufacturing process for cutting an elastic membrane material of a preferred embodiment of the present invention.
Figure 4:
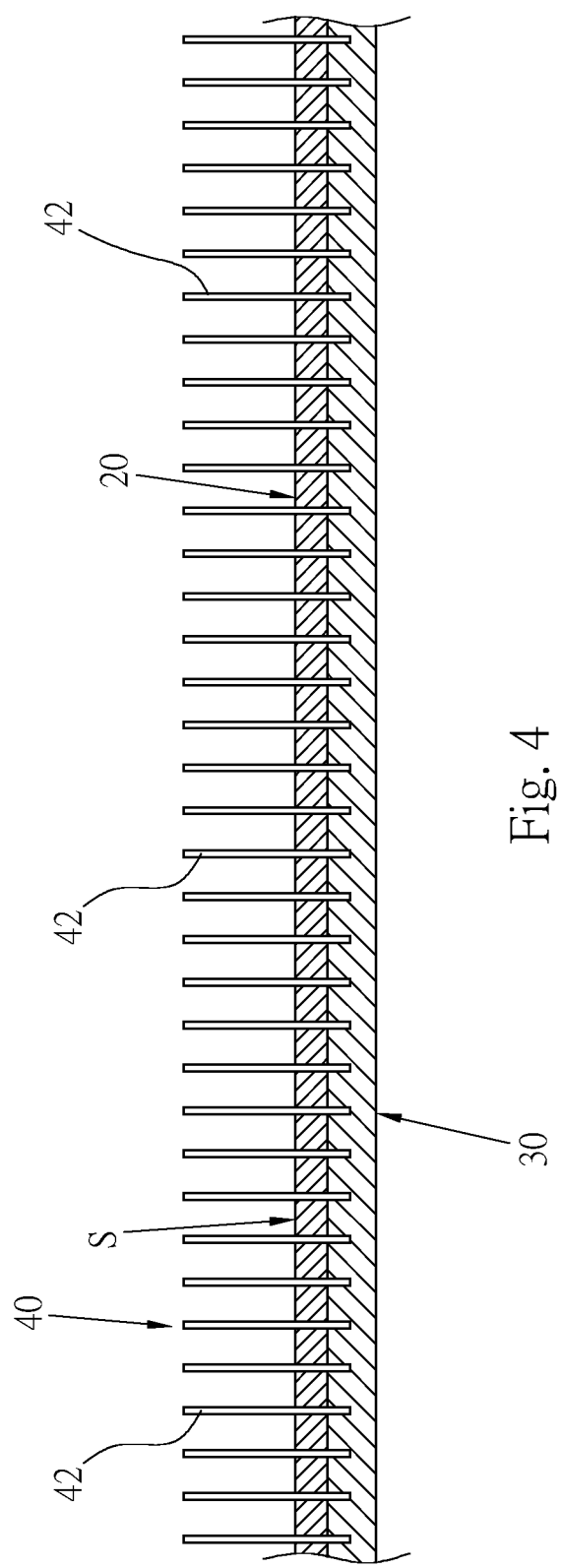
FIG. 4 is a schematic diagram taken along section line 4-4 in FIG. 3 to show a plurality of cutters cutting the elastic membrane material, and cutting a roll of semi-finished membrane material into a plurality of filaments.

The present invention provides an elastic filament made of elastic and soft high polymer material and a cutting method for the elastic filament. FIGS. 1 and 2 show an elastic filament 10 according to a preferred embodiment of the present invention; and FIGS. 3 and 4 are schematic diagrams of a manufacturing process of a method for manufacturing the elastic filament 10 according to a preferred embodiment of the present invention. In the present invention, an elastic membrane material made of high polymer material with stretched flexibility is prepared, temporarily bond the elastic membrane material with a cushion/support layer, then pull/drag/draw the elastic membrane material, and continuously cut the elastic membrane material with a cutting device into a plurality of filaments, and the filaments are separated from the cushion/support layer, and the filament is a finished product of the elastic filament of the present invention.

In the specification and claims of the present invention, the terms cushion layer and support layer refer to the same layer 30, and the terms pull, drag and draw have the same meaning and refer to move the elastic membrane material continuously.

Please refer to FIG. 3, in the present invention, an elastic membrane material 20 with a considerable length is cut into thin/fine/tiny elastic filaments. The elastic membrane material 20 of this preferred embodiment is in the form of a roll before cutting, the elastic membrane material 20 is pulled and drawn by means of rollers 22 or other means having a same function to continuously feed the elastic membrane material 20, and the elastic membrane material 20 is cut during the process of pulling/dragging the elastic membrane material 20, that is, pulling while cutting the elastic membrane material 20 simultaneously, and the elastic filament 10 shown in FIG. 1 is cut out.

The elastic membrane material 20 in the preferred embodiments of the present invention is a membrane material made of a high polymer material of PU (Polyurethane), PVC (Polyvinyl Chloride), TPU (Thermoplastic Polyurethane elastomer), TPE (Thermoplastic Elastomer), TPR (Thermoplastic Rubber) or silicone rubber with stretchable elasticity and softness. The thinner the elastic membrane material 20 the better, for example, but not limited to, with a thickness in a range of 0.02~1 mm, including 0.08~0.13 mm, and preferably 0.09~0.12 mm.

A sheet or membranous cushion layer/support layer 30 is a material with low flexibility and low ductility, and with a rigidity greater than that of the elastic membrane material 20, and can be made of paper or high polymer materials, such as but not limited to, release paper or release film, and PET (polyethylene terephthalate) membrane can be used for the release film. In this embodiment, the cushion layer/support layer 30 is in the form of a roll, and is temporarily bonded with the elastic membrane material 20 to form a semi-finished membrane material S. The term "temporary bonding" in the present invention means that an adhesion force between the elastic membrane material 20 and the cushion layer 30 is extremely low, and it is easy to peel off, and the adhesion force with a minimum adhesiveness is sufficient as long as the elastic membrane material 20 and the cushion layer 30 can be pulled and cut together. A temporary adhesive layer (not shown in the figures) can be adhered between the elastic membrane material 20 and the cushion layer 30, and the temporary adhesive layer does not have a residual glue phenomenon, that is, when the elastic membrane material 20 and the cushion layer 30 are separated, a surface of the elastic membrane material 20 does not have a residual glue of the temporary adhesive layer; in other words, the surface of the elastic membrane material 20 will not be left with the glue of the temporary adhesive layer. In addition, the elastic membrane material 20 and the cushion layer/support layer 30 can also be bonded by electrostatic adsorption, and it is not necessary to provide an adhesive or an adhesive layer. A resin forming the elastic membrane material 20 is spread on the cushion layer 30 (release paper or release film), and the elastic membrane material 20 and the cushion layer 30 are temporarily bonded by electrostatic adsorption. As long as the elastic membrane material 20 has a strong support by the cushion layer and does not deform and can be cut, it is not limited to have glue or adhesive between the elastic membrane material 20 and the cushion layer 30.

It should be explained that, in order to allow the soft elastic membrane material 20 to be cut in subsequent manufacturing process, the present invention provides a hard material as a support for the elastic membrane material 20 to make it easier to cut the soft elastic membrane material 20. Therefore whether the cushion layer/support layer 30 is a plastic membrane or a resin-coated paper is not important, as long as the elastic membrane material 20 can be provided with support, so that the elastic membrane material 20 can be easily cut. Furthermore, excellent peelability is provided between the cushion layer 30 and the elastic membrane material 20. Preferably, an optimal range of a peeling force between the elastic membrane material 20 and the cushion layer 30 is: for the semi-finished membrane material S with a width of 2.5 cm, the elastic membrane material 20 and the cushion layer 30 are peeled off by applying a reversed tension of 180 degrees, and an optimal range of the reversed peeling force is between 20 and 80 g of acting force.

Figure 5A:
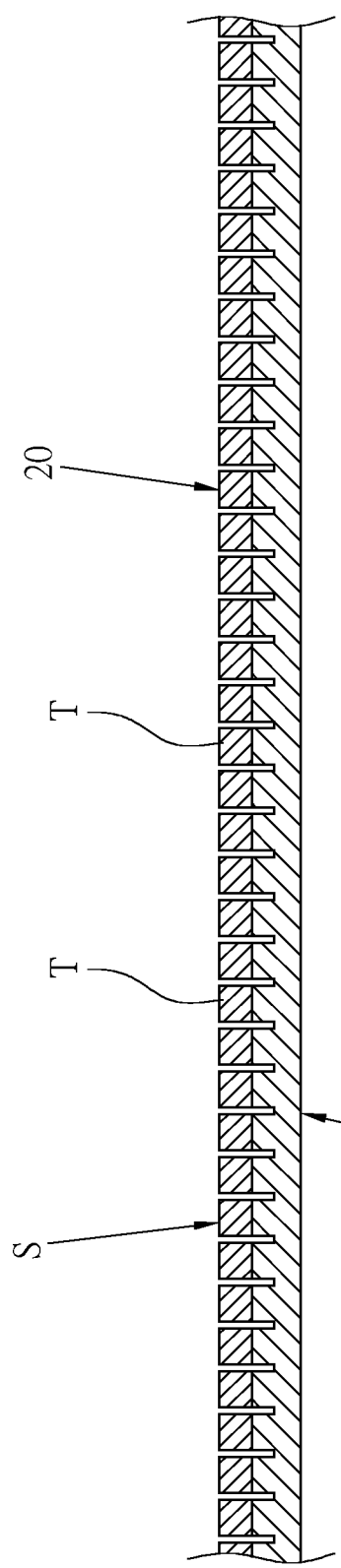
FIGS. 5A and 5B are schematic diagrams taken along section line 5-5 in FIG. 3 to show a mode of the elastic membrane material after being cut.
Figure 5B:
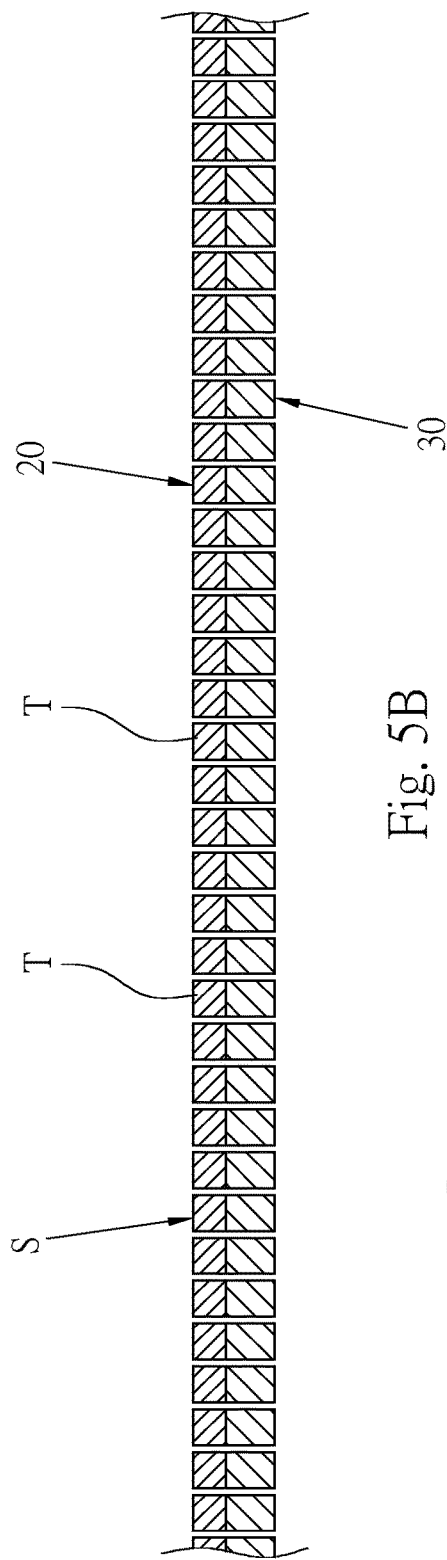

The semi-finished membrane material S is pulled/dragged by the rollers 22 to continuously feed toward a cutting device 40, and the elastic membrane material 20 on the semi-finished membrane material S is cut into filaments with the cutting device 40. Please refer to FIG. 4, the cutting device 40 provides a plurality of cutters 42, for example, but not limited to, the 100 cutters 42 are arranged within a width of 1 to 1.5 cm; the elastic membrane material 20 on the semi-finished membrane material S is cut by the cutters 42 into a plurality of filaments T, as shown in FIG. 5. The illustrated cutter 42 is only an example, and the cutter 42 can be a circular knife, which cuts the elastic membrane material 20 by rotating. FIG. 5A and FIG. 5B show schematic diagrams of the semi-finished membrane material S after being cut by the cutters 42. On the cushion layer/support layer 30, the filaments T are cut and formed, and a cutting depth of the cutter 42 reaches the cushion layer 30 to cut off the elastic membrane material 20. FIG. 5A shows that the cutters 42 do not cut off the cushion layer 30; FIG. 5B shows that the cutters 42 cut off the cushion layer 30; whether to cut off the cushion layer 30 or not when cutting the elastic membrane material 20 is a choice in implementation.

Then, as shown in the left side of FIG. 3, the cut filaments T are peeled off from the cushion layer 30 and wound into rolls. In this way, the cutting process is completed consistently and automatically, and the semi-finished membrane material S is continuously pulled/dragged. After cutting the elastic membrane material 20 into the filaments T with the cutters 42, the cut filaments T are wound up.

Figure 6:
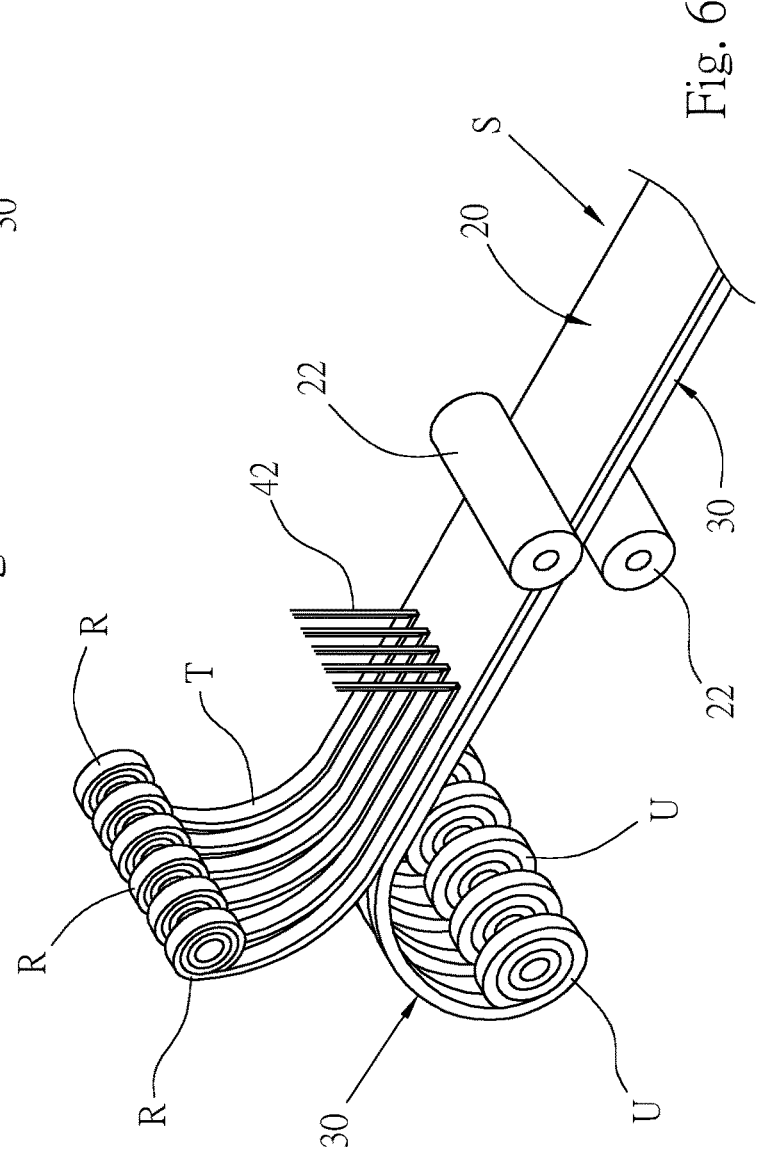
FIG. 6 is a perspective view of a part of the structure of FIG. 3.

Please refer to FIG. 6, which is a perspective view of a part of the structure of FIG. 3, and shows only some of the cutters 42 and some of the filaments T, but not all of them. After the elastic membrane material 20 on the semi-finished membrane material S is cut into the filaments T by the cutters 42, each of the filaments T is wound into a filament roll R by a take-up machine (not shown in the figure). Similarly, the cushion layer 30 is also wound into a plurality of rolls U. The cushion layer 30 in FIG. 6 is cut off and wound into a plurality of cushion layer rolls U. The 245 filaments T and the 245 cut-off cushion layers 30 of the present invention's implementation structure are wound up by a take-up machine with 490 winders. The present invention cuts a single roll of the semi-finished membrane material S into a large number of the thin filaments T, and winds up the filament rolls R. The semi-finished membrane material S with a width of several centimeters to several tens of centimeters can be cut into the 245 filaments T.

Figure 7:
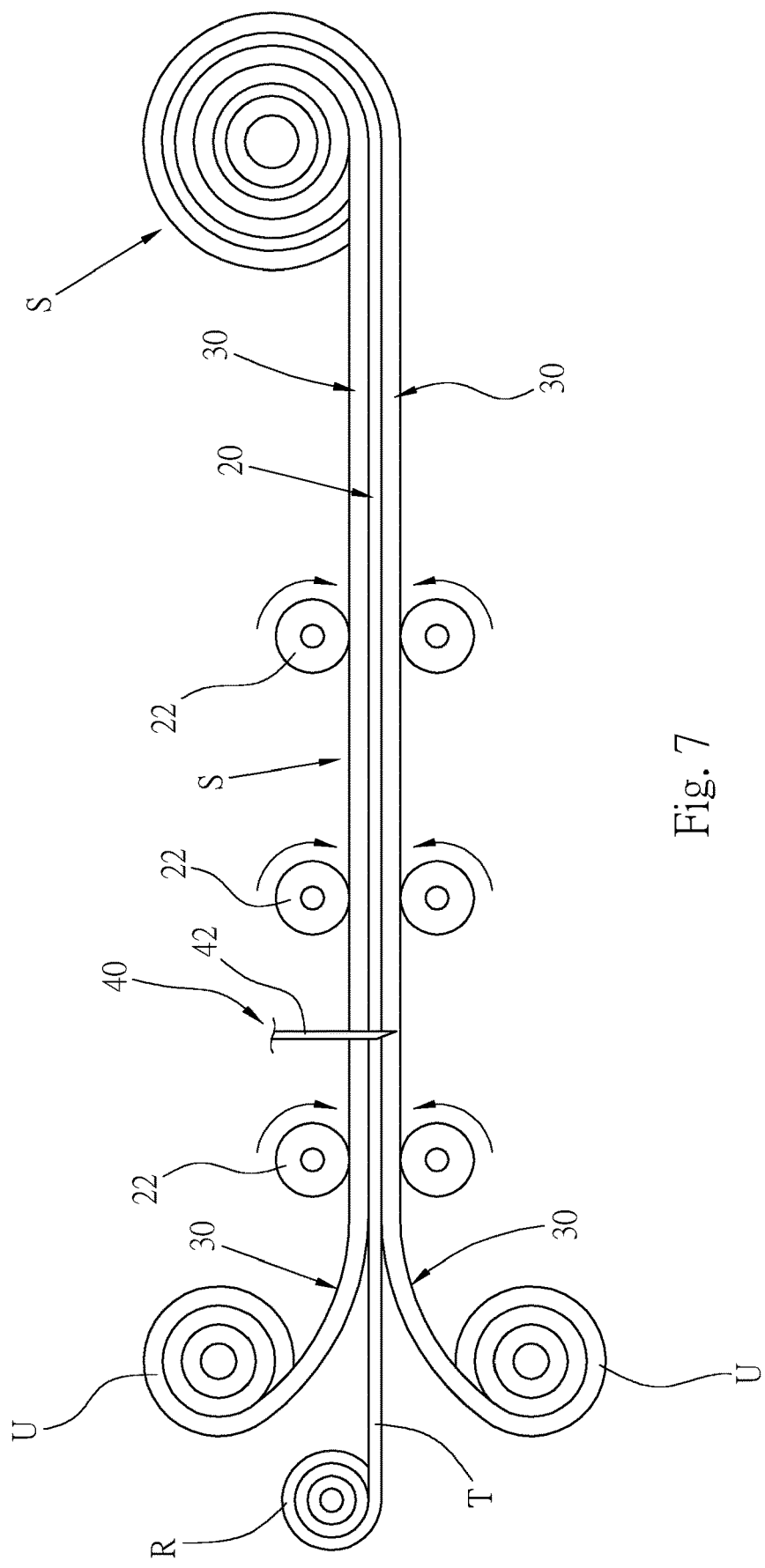
FIG. 7 is a schematic diagram of a manufacturing process of a second preferred embodiment of the present invention.

FIG. 7 is a second preferred embodiment of a manufacturing process of the present invention. This embodiment is generally the same as the first preferred embodiment, and the same components use the same referenced numerals for easy understanding. In this preferred embodiment, the cushion layer/support layer 30 made of PET membrane is temporarily bonded to front and back sides of the elastic membrane material 20 respectively to form the semi-finished membrane material S. The semi-finished membrane material S is cut by the cutter 42 during pulling/dragging, the filament T formed after cutting is separated from the upper and lower cushion layers 30, and the filament T is wound into the filament roll R to manufacture the elastic filament 10 of the present invention.

Whether the elastic membrane material 20 is bonded with one layer or two layers of the cushion layer 30 is an implementation choice. The elastic membrane material 20 being temporarily bonded with one layer of the cushion layer/support layer 30 is used as an example in the other embodiments described in the following description of the present specification.

The filament T cut and formed with the above-mentioned manufacturing method is the elastic filament 10 shown in FIG. 1, which has stretchable elasticity, and a width of the elastic filament 10 is determined by a thickness being cut, and the thickness can be but is not limited to 0.09~3 mm, preferably 0.1~0.16 mm. Due to the cutting and forming, a cross-section of the elastic filament 10 is rectangular or approximately rectangular, and a pair of opposite sides thereof, that being two side surfaces 12, are planes formed by cutting, and a top surface 13 and a bottom surface 14 are also flat, which are formed by top and bottom surfaces of the elastic membrane material 20. With the manufacturing method of the present invention, the elastic filament 10 with a considerable length can be made, a length of the elastic filament 10 depends on a length of the elastic membrane material 20. For example, if a length of the elastic membrane material 20 is 3000 meters or 4000 meters, the elastic filament 10 made is 3000 meters or 4000 meters long. The elastic filament 10 made by continuous cutting has a successive length, for example, a length of at least more than one hundred meters can be used for weaving. If a thickness of the elastic membrane material 20 and a cut width of the elastic filament 10 are the same, for example, both are 0.1 to 0.16 mm, a diameter of the cut elastic filament 10 is 0.1 to 0.16 mm.

According to the manufacturing method disclosed in the present invention, it is capable of solving the drawback that the prior art is incapable of continuously cutting the high polymer membrane material with flexibility, especially solving the problem that the prior art is incapable of cutting the high polymer elastic membrane material into filaments during the process of pulling/dragging the high polymer elastic membrane material. In the present invention, the cushion layer/support layer 30 and the elastic membrane material 20 are temporarily bonded into the semi-finished membrane material S, and the semi-finished membrane material S is continuously fed and cut. Since a ductility of the cushion layer 30 is low, the semi-finished membrane material S is capable of maintaining an even and a same tension when the semi-finished membrane material S is pulled/dragged, so that a tension at different positions of the elastic membrane material 20 is even and without uneven stretching or tension. Therefore, the elastic filament 10 with a uniform width can be cut. Secondly, since the elastic membrane material 20 is supported by the cushion layer/support layer 30, when the cutter 42 cuts the elastic membrane material 20, the cushion layer 30 forms a support pad under the elastic membrane material 20, so that the elastic membrane material 20 does not flex. The cutter 42 can certainly cut the elastic membrane material 20, and can certainly cut off the elastic membrane material 20 without causing the problem of defective products. The cut elastic filament 10 is flat and straight, has a same thickness, and does not form corrugations, wavy form, or inconsistent widths.

Furthermore, by temporarily bonding the elastic membrane material 20 on one layer or two layers of the cushion layer/support layer 30, the problem that some materials of the elastic membrane material 20 are stacked on each other does not occur, and the neat elastic filament 10 can be certainly cut out.

A fabric woven with the elastic filament 10 has excellent softness, tactile impression and flexibility, which is capable of solving the problem and drawback that yarns cut from a membrane material by using the existing technique are too hard. And because the elastic filament 10 has a uniform diameter, a same thickness, and flexibility, when a knitting machine hooks and pulls the elastic filament 10 to weave into a fabric, it is not easy for the elastic filament 10 to break.

The following preferred embodiment of the present invention further provides the elastic filament 10 with at least one functional layer to provide an elastic filament with reflective, luminescent and metallic texture effects, and an elastic filament with conductive slurry of solar cells.

The cutting method, and the materials of the elastic membrane material and the elastic filament disclosed in the first preferred embodiment are applicable to all the embodiments described in the present invention.

Figure 8:
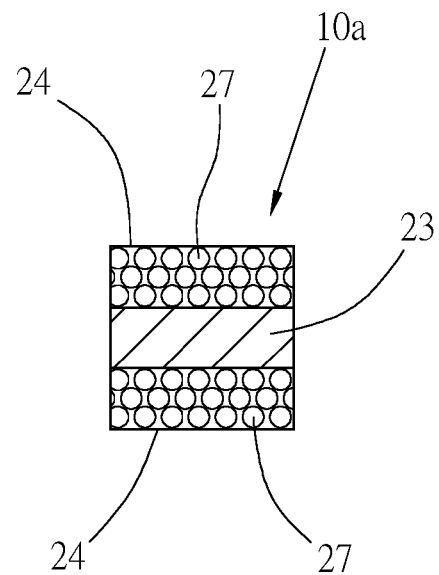
FIG. 8 is an enlarged cross-sectional view of the elastic filament of a third preferred embodiment of the present invention.

Please refer to FIG. 8, which shows a cross-sectional view of an elastic filament 10*a* provided by a third preferred embodiment of the present invention. The elastic filament 10*a* has a luminescent effect, and is also made and formed with the manufacturing method of FIG. 3. The elastic filament 10*a* of this embodiment is formed by cutting an elastic membrane material 20*a* with luminescent function.

Figure 9:
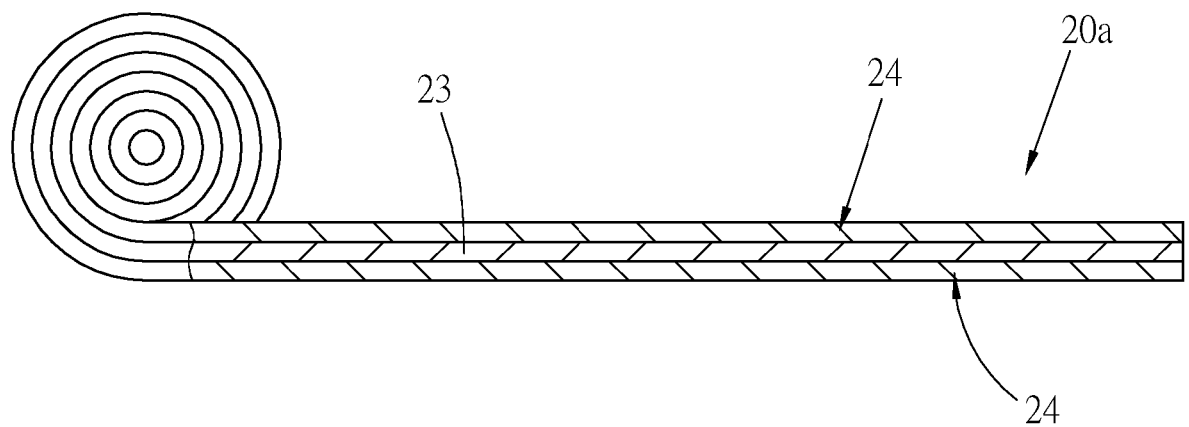
FIG. 9 is a cross-sectional view of the elastic membrane material of a third preferred embodiment of the present invention.
Figure 10:
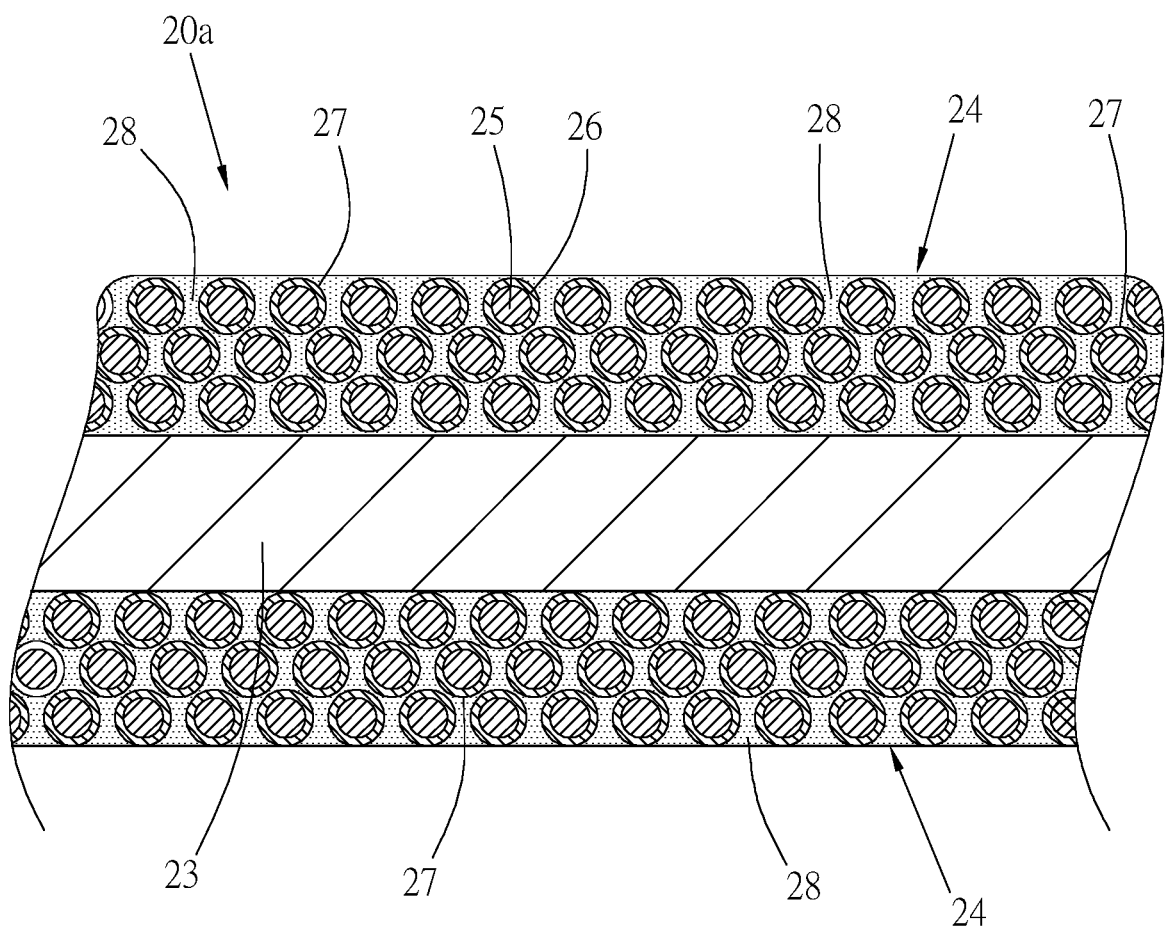
FIG. 10 is an enlarged view of FIG. 9.

Please refer to FIG. 9 and FIG. 10, the elastic membrane material 20*a* is a layered structure with two or more layers, and has: a base layer 23, and one layer of a luminescent layer 24 with luminescent effect bonded or spread on at least one surface of the base layer 23.

The base layer 23 of this preferred embodiment is a layer of stretchable elastic membrane. Any base layer can be used as the base layer 23 of the present invention as long as a layer of membrane can be formed and with a stretchable elastic high polymer material or high molecular polymer, for example, but not limited to: PVC (Polyvinyl Chloride), TPU (Thermoplastic Polyurethane elastomer), TPE (Thermoplastic Elastomer), TPR (Thermoplastic Rubber), hot melt adhesive or silicone rubber. In this preferred embodiment, the luminescent layer 24 is spread on both surfaces (a first surface and a second surface) of the base layer 23, and the luminescent layer 24 is capable of emitting luminescence in a place without light source or with a low light source.

Figure 11:
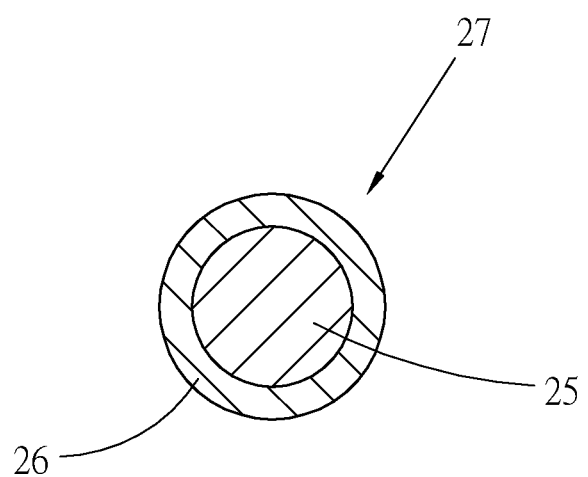
FIG. 11 is a cross-sectional view of a microcapsule luminescent granule.

Please refer to FIG. 10, the luminescent layer 24 of this preferred embodiment is formed by mixing a mixture of luminescent particles 25 and a high polymer resin. Please refer to FIG. 11, the luminescent particle 25 is tiny as powder. The luminescent particle 25 is a product of rare earth elements mixed with alkaline earth aluminate or silicate, and is a tiny particle with a size of 5 μm~200 μm. The luminescent particle 25 itself is capable of emitting luminescence, its luminescent color can be made into lemon yellow, light yellow, green, grass green, yellow green, cyan, sky blue and purple colors of light rays. A surface of the luminescent particle 25 of the present invention is coated with a transparent resin to form a microcapsule structure (that is, a tiny coating layer coating the tiny luminescent particle). The transparent resin forms a coating layer 26 to coat each of the luminescent particles 25 to completely block the luminescent particles 25 from the outside, so that the luminescent particles 25 will not come in contact with the outside in order to prevent chemical reaction of the luminescent particles 25 with water or other substances. For example, to prevent the luminescent particles 25 from becoming a strong alkali after contacting with water, the skin will be damaged if the luminescent particles 25 become a strong alkali (PH value reaches 11), and the luminescent particles 25 will lose the effect of luminescence due to long-term contact with water. The luminescent particle 25 coated by each of the coating layers 26 forms a microcapsule luminescent granule 27. It should be explained that, since the luminescent particle 25 is tiny, the luminescent particles 25 can be coated by one of the coating layers 26 during manufacturing, so each of the microcapsule luminescent granules 27 may contain one or more than one of the luminescent particles 25. The transparent resin of the present invention used to form the coating layer 26 is a resin capable of resisting potassium chloride to prevent the luminescent particles 25 from contacting water and releasing a strong alkali. Since the transparent resin is colorless, the coating layer 34 is transparent and colorless.

An appropriate amount of the microcapsule luminescent granules 27 is mixed with a resin 28 to form a mixture, for example, to form a mixed liquid, the luminescent particles 25 are evenly distributed in the mixed liquid, and the mixed liquid is bonded or spread on the two surfaces of the base layer 23 to form the two luminescent layers 24; the microcapsule luminescent granules 27 are evenly distributed in the luminescent layers 24. The resin 28 used in the mixed liquid of this preferred embodiment is a polyurethane (PU) resin, which is transparent and colorless.

Figure 12:
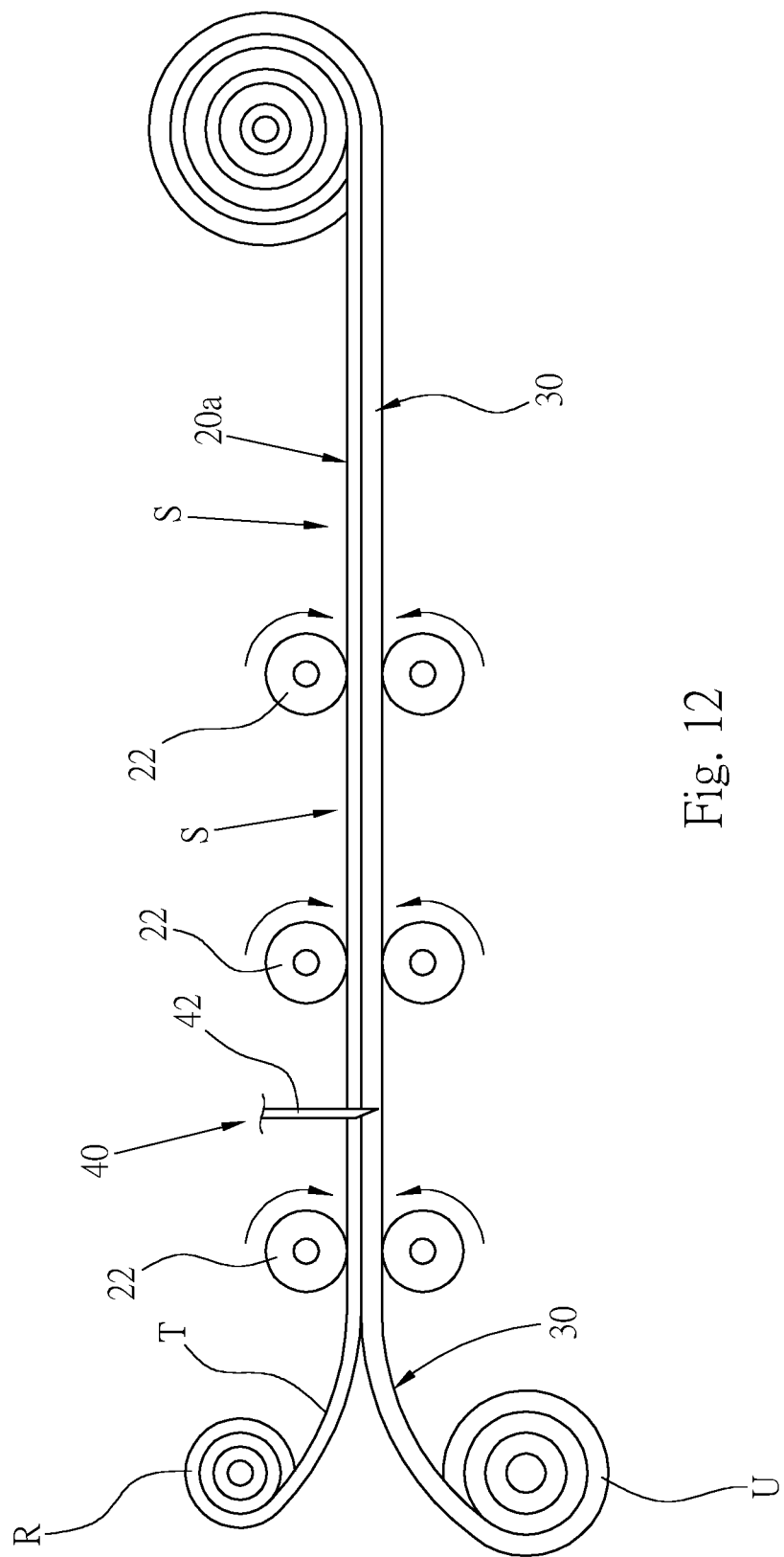
FIG. 12 is a schematic diagram of a manufacturing process for cutting the elastic membrane material of FIG. 9.

Please refer to FIG. 12, after the elastic membrane material 20a is manufactured, the elastic membrane material 20a is temporarily bonded with the sheet or membranous cushion layer/support layer 30 to form the semi-finished membrane material S, and the semi-finished membrane material S is pulled/dragged to the cutting device 40. During the pulling process, the elastic membrane material 20a is cut into the filaments T by the cutters 42, and then the filaments T are separated from the cushion layer 30. The cut filaments T are the elastic filaments 10a of this embodiment. Please refer to FIG. 8, the elastic filament 10a has the base layer 23, and both top and bottom surfaces of the elastic filament 10a have the luminescent layers 24 to cause the elastic filament 10a become the elastic filament 10a with luminescent effect, and the two luminescent layers 24 are functional layers of the elastic filament 10a. For the cushion layer/support layer 30 and the temporary bonding, please refer to the description of the first preferred embodiment, which will not be described in detail here. A width of the elastic filament 10a can be, but not limited to 0.09~3 mm, wherein a fabric woven with the elastic filament 10a with a 0.09~0.16 mm width or diameter can be used as a cloth for garment; and the elastic filament 10a with a 0.5~3 mm width can be used to weave into a strap.

Figure 13:
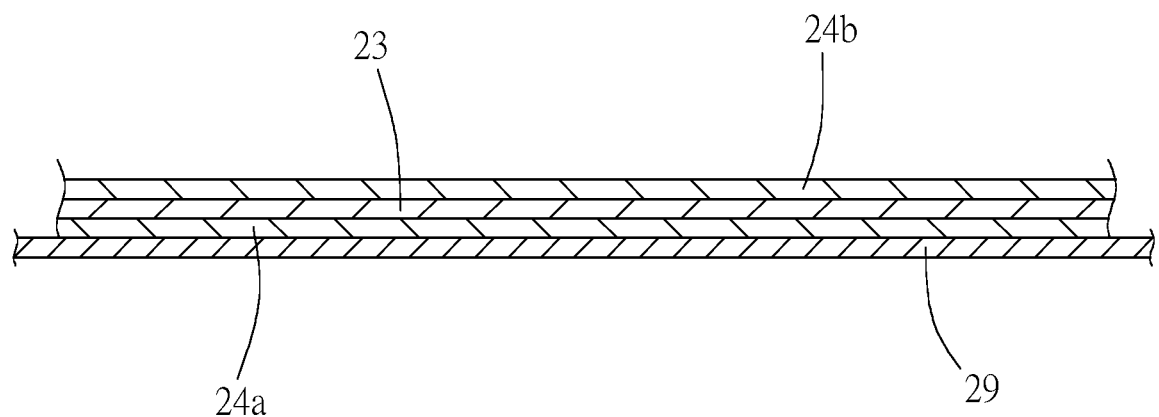
FIG. 13 is another manufacturing method for the elastic membrane material of FIGS. 9 and 10.

FIG. 13 shows another manufacturing method of the elastic membrane material with luminescent effect of the present invention. The manufacturing method includes: firstly preparing a carrier 29 being a release film, such as a release film of high polymer material or a release paper; then, sequentially spreading a luminescent layer 24a (first layer), the base layer 23 (second layer) and another luminescent layer 24b (third layer) on the carrier 29 from bottom to top, removing the carrier 29 after the three layers being shaped to form the elastic membrane material 20a shown in FIG. 10, and both the two surfaces of the base layer 23 having the luminescent layers. The base layer 23 and each of the luminescent layers 24 (24a or 24b) of FIG. 13 are the same as the base layer 23 and the luminescent layers 24 of FIG. 10.

Figure 14:
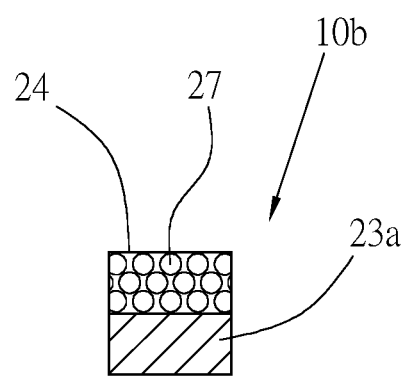
FIG. 14 is a cross-sectional view of the elastic filament of a fourth preferred embodiment of the present invention.

FIG. 14 is a cross-sectional view of an elastic filament 10b according to a fourth preferred embodiment of the present invention. The elastic membrane material used to cut into the elastic filaments has a base layer and a luminescent layer. Therefore, the elastic filament 10b is a structure with a dual-layered cross section, and has a base layer 23a and the luminescent layer 24 located on a surface of the base layer 23a. The luminescent layer 24 is the same as the luminescent layer 24 shown in FIG. 10; a composition of the base layer 23a is the same as that of the base layer described in the previous embodiments, and has light transmittance. Therefore, luminescence of the luminescent layer 24 is capable of penetrating another surface of the base layer 23a, so that peripheral surfaces of the elastic filament 10b has luminescence.

The aforementioned embodiment does not change an appearance color of the elastic filament with luminescent effect; the technical content of the present invention is capable of further making the elastic filament with luminescent effect to have different appearance colors, so that the elastic filament displays the manufactured color in the daytime or in a bright place. The appearance color is neither a luminescent color of a luminescent powder itself, nor a color of a raw material of the base layer, but a dyeing method is used to change the appearance color of the elastic filament.

Figure 15:
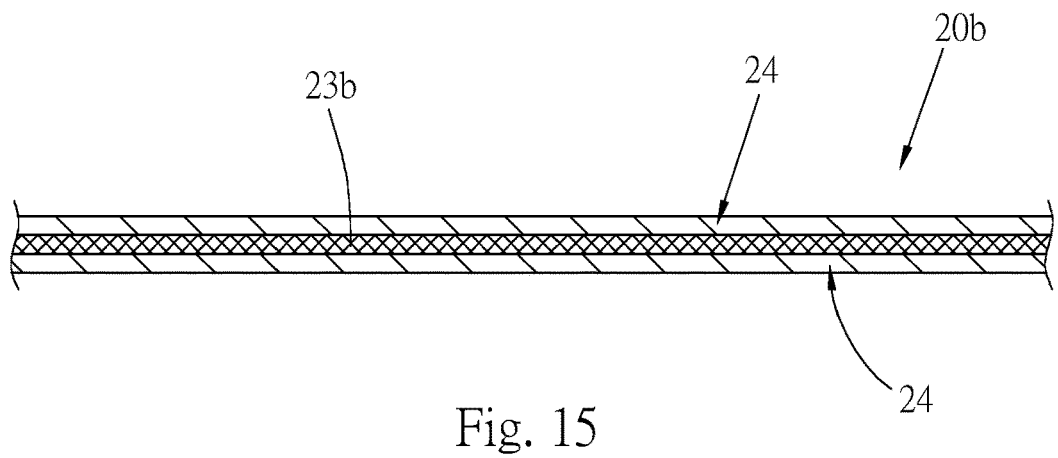
FIG. 15 is a cross-sectional view of the elastic membrane material of a fifth preferred embodiment of the present invention.

FIG. 15 is a cross-sectional view of an elastic membrane material 20b according to a fifth preferred embodiment of the present invention, which is also made with the manufacturing method of FIG. 10 or FIG. 13, and has a base layer 23b and the two luminescent layers 24 spread on two surfaces of the base layer 23b respectively, and the base layer 23b and the luminescent layers 24 can be the same as those described in the foregoing embodiment. Wherein, the base layer 23b is made to have different colors by adding dyes or pigments, for example, a dye is injected into the base layer 23b, or a dye and the base layer 23b are rolled and uniformly mixed by a calendar to make the base layer 23b to have the color of the dye, rather than a color of a raw material of the base layer 23b. By changing a color of the base layer 23b, the elastic membrane material 20b can be made to display different colors. Thereby, the elastic membrane material 20b can be made into the elastic filaments with various luminescent effects of different appearance colors. For example, the base layer 23b is made to have a pink color, during the daytime, the elastic filament is displayed in pink, but at nighttime, a luminescence emitted by the elastic filament is not pink.

Figure 16:
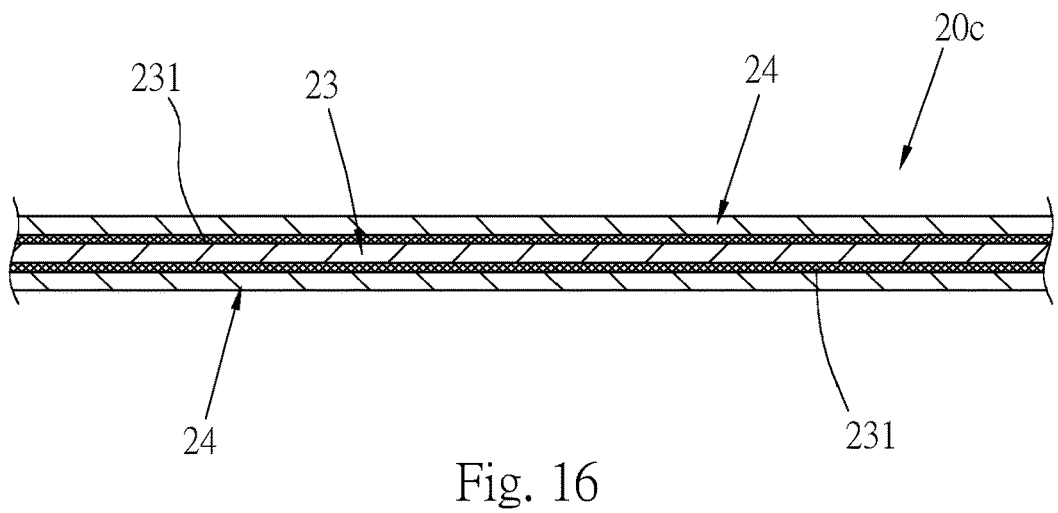
FIG. 16 is a cross-sectional view of the elastic membrane material of a sixth preferred embodiment of the present invention.

FIG. 16 is a sixth preferred embodiment of an elastic membrane material 20c of the present invention, which includes: the base layer 23, two color layers 231, and the two luminescent layers 24. The two color layers 231 are high polymer material membranes, and the two color layers 231 are respectively disposed on the two surfaces of the base layer 23, for example, by printing, spreading (including spreading on a carrier) or bonding. The two luminescent layers 24 are respectively disposed on outer surfaces of the two color layers 231 by spreading (including spreading on a carrier) or bonding. When manufacturing the elastic membrane material 20c, the color layer 231 with a desired color can be selected so that a color of the two color layers 231 becomes a color of the elastic membrane material 20c, that is, in this embodiment, colors of the base layer 23 and the elastic membrane material 20c are changed by the two color layers 231.

Figure 17:
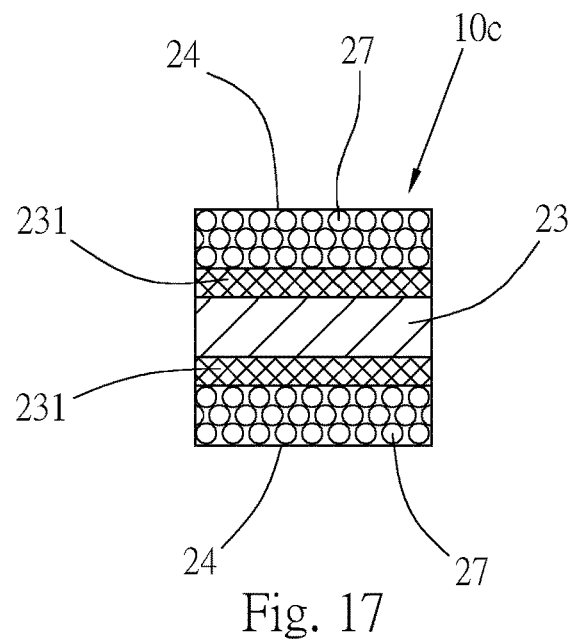
FIG. 17 is a cross-sectional view of the elastic filament formed by cutting the elastic membrane material of FIG. 16.

FIG. 17 is a cross-sectional view of an elastic filament 10c cut out and made from the elastic membrane material 20c of FIG. 16. The elastic filament 10c is a multi-layered structure, and a cross-section thereof has the base layer 23, the two color layers 231 provided on the two surfaces of the base layer 23 respectively, and the two luminescent layers 24 located on the outer surfaces of the two color layers 231. The two color layers 231 are capable of changing a color of the base layer 23, and thereby changing an appearance color of the elastic filament 10c.

Figure 18:
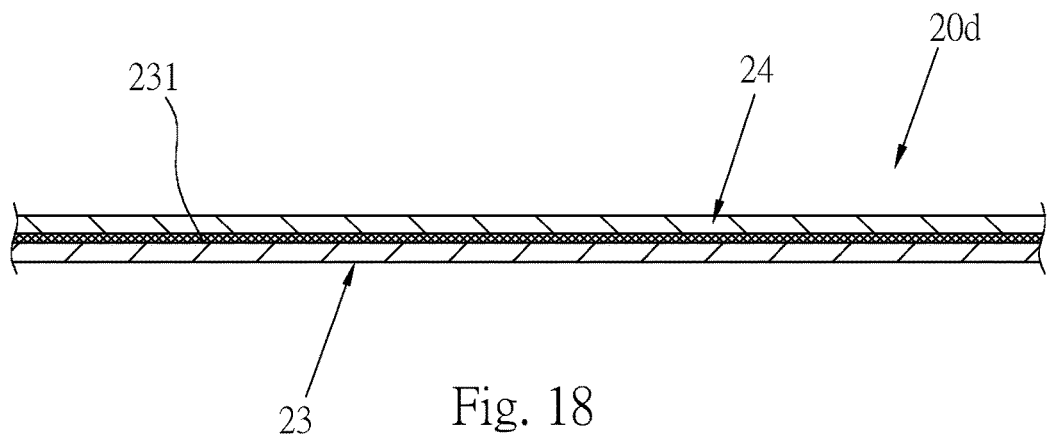
FIG. 18 is a cross-sectional view of the elastic membrane material of a seventh preferred embodiment of the present invention.

FIG. 18 is a seventh preferred embodiment of an elastic membrane material 20d of the present invention, which includes: the base layer 23, the color layer 231 provided on one of the surfaces of the base layer 23, and the luminescent layer 24 provided on the outer surface of the color layer 231. A color of the color layer 231 becomes an appearance color of the elastic membrane material 20d. A cross-sectional structure of the elastic filament made from the membranous elastic membrane material 20d has the base layer 23, the color layer 231 and the luminescent layer 24.

Figure 19:
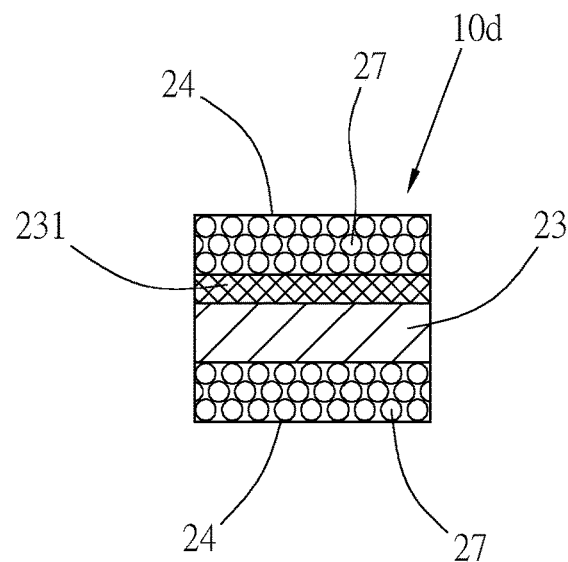
FIG. 19 is a cross-sectional view of the elastic filament of an eighth preferred embodiment of the present invention.

Understandably, the elastic membrane material can also be provided with a base layer, a color layer and two luminescent layers in implementation, the color layer 231 is provided on one of the surfaces (the first surface) of the base layer 23, and the two luminescent layers 24 are respectively provided on the outer surface of the color layer 231 and the other surface (the second surface) of the base layer 23, so that an appearance color of the elastic membrane material can still be changed by the color layer 231, and the two surfaces of the elastic membrane material have the luminescent layers 24 to emit luminescence. As shown in FIG. 19, a manufactured elastic filament 10d has the base layer 23; the color layer 231 provided on the first surface of the base layer 23; and the two luminescent layers 24 respectively located on the second surface of the base layer 23 and the outer surface of the color layer 231.

Figure 20:
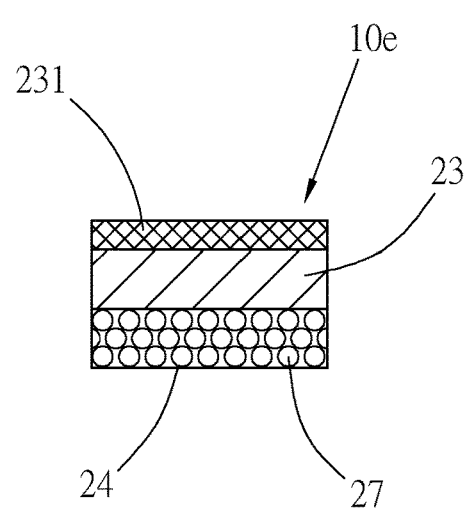
FIG. 20 is a cross-sectional view of the elastic filament of a ninth preferred embodiment of the present invention.

In implementation, the elastic membrane material can also have a base layer, a color layer and a luminescent layer, the color layer is provided on one surface (first surface) of the base layer, and the luminescent layer is provided on another surface (second surface) of the base layer, in this way, an appearance color of the elastic membrane material can still be changed by the color layer. As shown in FIG. 20, a manufactured elastic filament 10e has the base layer 23; the color layer 231 provided on the first surface of the base layer 23; and the luminescent layer 24 located on the second surface of the base layer 23.

The luminescent layer 24 of the elastic filaments 10a to 10e with luminescent effect of the present invention is located on the surface of the elastic filaments 10a to 10e, which is capable of directly absorbing an energy of a light source, improving an energy storage efficiency and extending a length of time of luminescence; when the luminescent layer 24 emits luminescence, it is not shielded or blocked, and the elastic filaments 10a to 10e have a high luminescent brightness.

The luminescent particles 25 in the luminescent layer 24 of the present invention are coated with the transparent coating layer 26, the coating layer 26 has a low opacity, which improves an efficiency and amount of light penetrating through the coating layer 26, and makes the luminescent particles 25 to be capable of absorbing light source and storing luminous energy more effectively. Similarly, since a penetration rate of light rays irradiated by the luminescent particles 25 penetrating through the coating layer 26 is enhanced, luminescence can be irradiated more effectively and light rays emitted by the luminescent particles 25 have a higher brightness. Therefore, the microcapsule luminescent granules 27 have extremely high transmittance and luminance.

The present invention enables the luminescent particles 25 to be coated by the coating layer 26 to prevent from reacting with the outside, and the luminescent layer 24 has a long service life. Furthermore, since the luminescent particles 25 are coated by the coating layer 26, the luminescent particles 25 will not be released to prevent from combining with water to become a strong alkali. Therefore, the elastic filaments of the present invention meet a required pH value of fabrics within a range of 4.5~8.5.

The technical means of the present invention can change a color of the base layer, so that the elastic filament with luminescent function has a specific color during the daytime. According to the structural features of the present invention, the dye or pigment used to change an appearance color of the base layer, the elastic membrane material or the luminescent layer will not infiltrate into the particles of the luminescent powder, will not affect the irradiation and light absorption efficiency of the luminescent powder, and make the luminescence of the luminescent layer of the elastic filament to have high brightness.

Please refer to FIG. 21 and FIG. 22, which are a tenth preferred embodiment of the cutting method for the elastic membrane material of the present invention. An elastic membrane material 20f has a reflective effect, and has: a bonding layer 50 and two reflective layers 52. The reflective layer 52 is made of a high polymer material, and is a reflective membrane with flexibility and reflective effect. The bonding layer 50 in this embodiment is an adhesive layer or a layer of hot melt adhesive, so that the two reflective layers 52 are bonded by the bonding layer 50. A thickness of the elastic membrane material 20f is 0.06~3 mm, preferably 0.09~0.2 mm.

The elastic membrane material 20f is temporarily bonded with the sheet or membranous cushion layer/support layer 30 to form the semi-finished membrane material S, and the semi-finished membrane material S is pulled/dragged to the cutting device 40, and the elastic membrane material 20f is cut into the filaments T, and then the filaments T are separated from the cushion layer 30, and the cut filament T is an elastic filament 10f of this embodiment, as shown in FIG. 23. The elastic filament 10f is a three-layered structure with the two reflective layers 52 and the bonding layer 50 located between the two reflective layers 52. A width (a width cut by the cutter 42) of the elastic filament 10f is between 0.09 and 3 mm, preferably 0.1~0.16 mm.

Surfaces of the elastic filament 10f have the two reflective layers 52. Taking FIG. 23 as an example, the two reflective layers 52 are located at top and bottom surfaces of the elastic filament 10f and exposed at two sides of the elastic filament 10f, so that any one of the surfaces of the elastic filament 10f provides reflective effect, and therefore the elastic filament 10f has excellent reflective effect. The two reflective layers 52 are functional layers of the elastic filament 10f.

Furthermore, the elastic filament 10f with reflective effect is a structure with only three layers, which is advantageous for being made as an elastic filament with a small diameter (thin thickness). The cushion layer 30 and temporary bonding can be referred to the description of the first preferred embodiment, which will not be described in detail here. A width of the elastic filament 10f can be, but not limited to 0.09~3 mm, preferably 0.1~0.16 mm.

It can be understood that the elastic membrane material 20f can have a single reflective layer 52 (that is, a layer of reflective membrane), and a cross-sectional structure of the manufactured elastic filament 10f has the single reflective layer 52.

Figure 25:
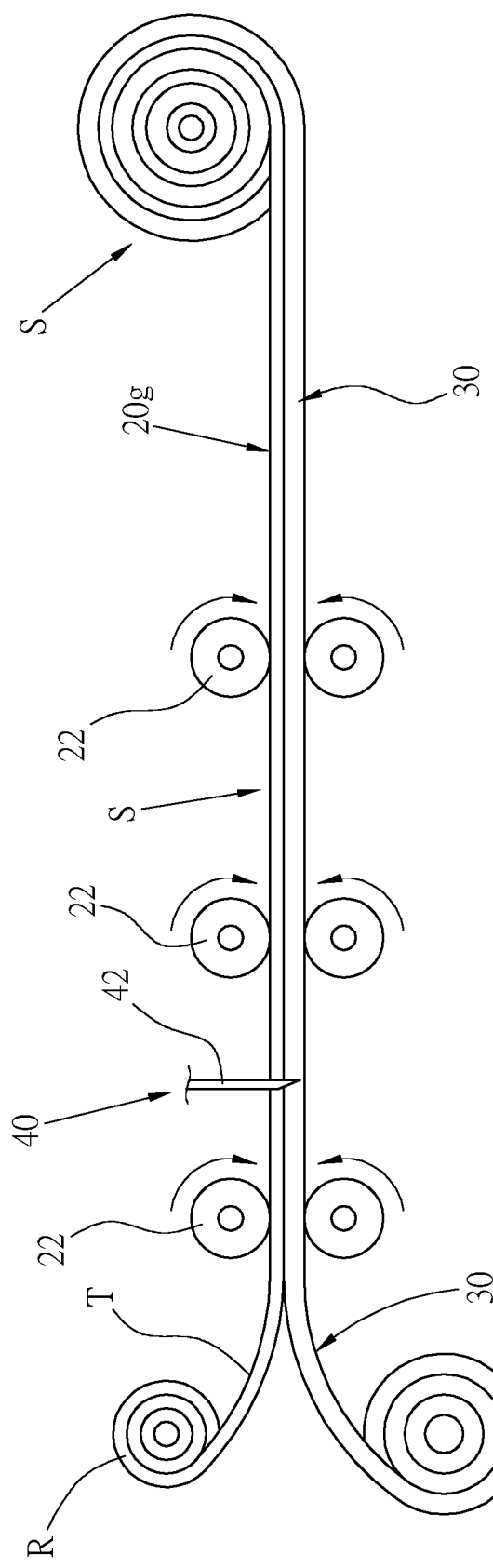
FIG. 25 is a schematic diagram of a manufacturing process for cutting the elastic membrane material of an eleventh preferred embodiment of the present invention.
Figure 24:
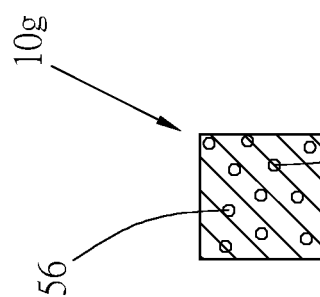
FIG. 24 is a cross-sectional view of the elastic filament of an eleventh preferred embodiment of the present invention.
Figure 26:
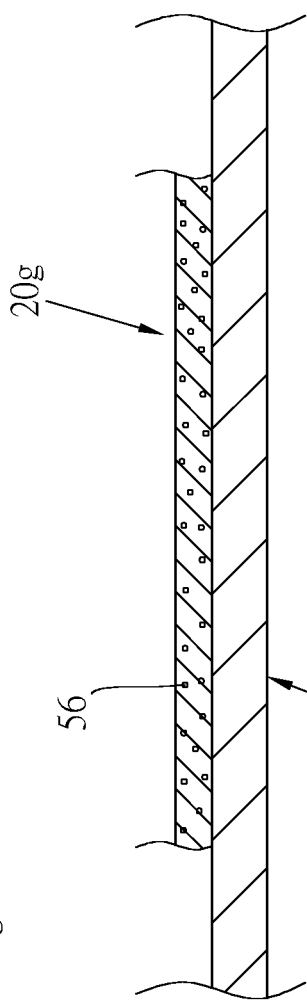
FIG. 26 is a partial enlarged view of the elastic membrane material and the cushion layer of FIG. 25.

FIG. 24 is a cross-sectional view of an elastic filament 10g provided by an eleventh preferred embodiment of the present invention. The elastic filament 10g has a metallic texture in appearance, and is made by cutting an elastic membrane material 20g of FIGS. 25 and 26.

The elastic membrane material 20g is made of the high polymer material described in the foregoing embodiments, for example, the first preferred embodiment, and has flexibility. A metal powder 56 with a metal component of aluminum, silver, gold, tin, or copper is added and uniformly distributed in the elastic membrane material 20g. In this preferred embodiment, fine aluminum powder is used, for example, aluminum powder with a particle size of, but not limited to 5 μm to 100 μm, and added in the liquid state elastic membrane material 20g. The elastic membrane material 20g contains the aluminum powder (the metal powder 56) after being shaped. Similarly, a thickness of the elastic membrane material 20g is between 0.06 and 3 mm, preferably between 0.09 and 0.2 mm.

The elastic membrane material 20g and the cushion layer/support layer 30 are temporarily bonded into the semi-finished membrane material S, the semi-finished membrane material S is pulled/dragged to the cutting device 40, and the elastic membrane material 20g is cut into the filaments T, and then the filaments T are separated from the cushion layer 30. The cut filament T is the elastic filament 10g of this embodiment.

The metal powder (for example, aluminum powder) 56 can be made to have different colors, such as blue, silver, red, green, etc. The elastic filament 10g displays a specific metallic color in appearance.

The metal powder 56 of this embodiment is added into the elastic membrane material 20g, which is different from the conventional technique of surface vapor deposition (for example, vacuum aluminum plating) to plate metal components on a surface of an object. Since the metal powder 56 is located in the elastic filament 10g, the elastic filament 10g is soft and elastic, and has soft surfaces and excellent tactile impression. Clothing made of the elastic filament 10g is soft and comfortable to wear.

Figure 27:
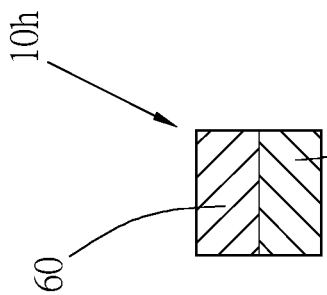
FIG. 27 is a cross-sectional view of the elastic filament of a twelfth preferred embodiment of the present invention.

FIG. 27 is a cross-sectional view of an elastic filament 10h provided by a twelfth preferred embodiment of the present invention. At least one surface of the elastic filament 10h has a layer of conductive slurry coating 60 (forming a functional layer of the elastic filament 10h), which can be used as an electrode material for solar cells.

Figure 28:
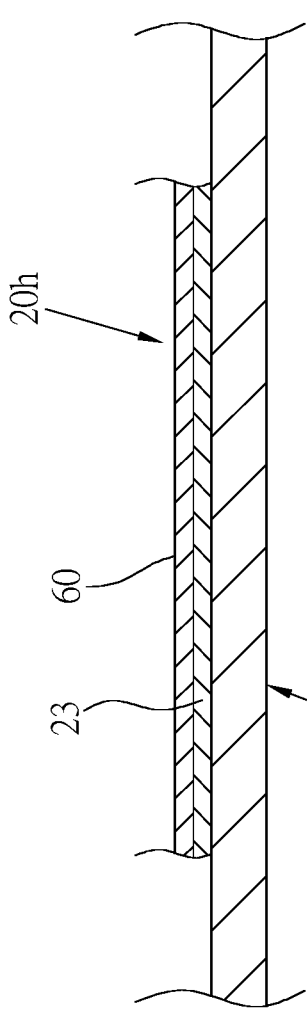
FIG. 28 is a cross-sectional view of the elastic membrane material of a twelfth preferred embodiment of the present invention.

FIG. 28 shows that an elastic membrane material 20h used to make the elastic filament 10h has the base layer 23, which is made of the high polymer material described in the previous embodiments and has flexibility. At least one conductive slurry coating 60 is spread on at least one of the surfaces of the base layer 23. In implementation, the top surface and the bottom surface of the base layer 23 can each be spread with the conductive slurry coating 60. The conductive slurry can be aluminum slurry, silver aluminum slurry or silver slurry, which is an electrode material of solar cells. The elastic membrane material 20h is temporarily bonded with the cushion layer/support layer 30, and the elastic membrane material 20h is cut into the elastic filaments 10h with the cutting method of the foregoing preferred embodiments.

At least one surface of the manufactured elastic filament 10h has the conductive slurry coating 60 capable of absorbing solar energy and converting solar energy into electrical energy.

Figure 29:
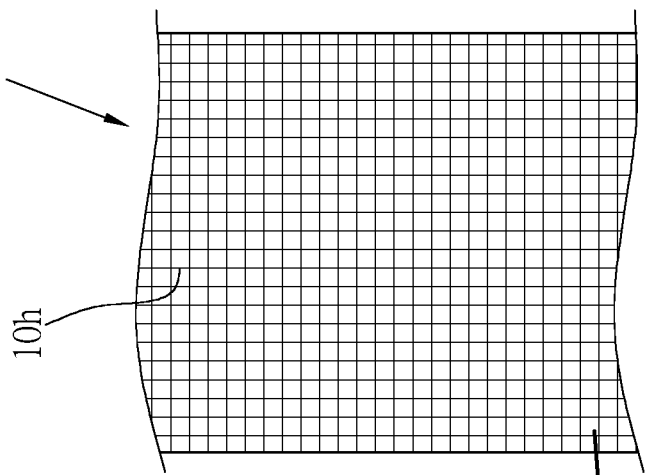
FIG. 29 is a schematic diagram of the elastic filaments woven into a fabric.

Please refer to FIG. 29, the elastic filaments 10h can be woven into a fabric and made into a clothing 70, and a rechargeable battery 72 is electrically connected to the elastic filaments 10h of the clothing 70 by an electric wire 74. Under the sunlight, the conductive slurry coating 60 of the elastic filaments 10h of the clothing 70 converts solar energy into electrical energy, and the electrical energy is stored in the battery 72 via the electric wire 74, so that the fabric has a conductive function and becomes a green energy product. When a user wears the clothing 70, the battery 72 can be put in a pocket. The battery 72 can also be a thin battery, and is sewn or attached on the clothing 70. LED lights (not shown in the figure) can be installed on the clothing 70, and powered by the battery 72. At nighttime, enable the LED lights on the clothing 70 to irradiate to increase safety.

The present invention provides the elastic filament and the manufacturing method thereof, which are capable of solving the problem over a long period of time in the past that the elastic filament cannot be made by continuous cutting. With the techniques of the present invention, the thin/fine/tiny elastic filaments can be quickly manufactured in large quantities, and a fabric woven with the elastic filaments has the effects of softness, close-fitting, and excellent tactile impression.

The manufacturing method of the present invention is capable of further making the functional elastic filaments with luminescent and reflective effects, and the elastic filaments with special appearance of metallic texture. The elastic filaments with conductive function capable of converting solar energy into electrical energy are also provided, so that the elastic filament become a green energy product.

Figure 30:
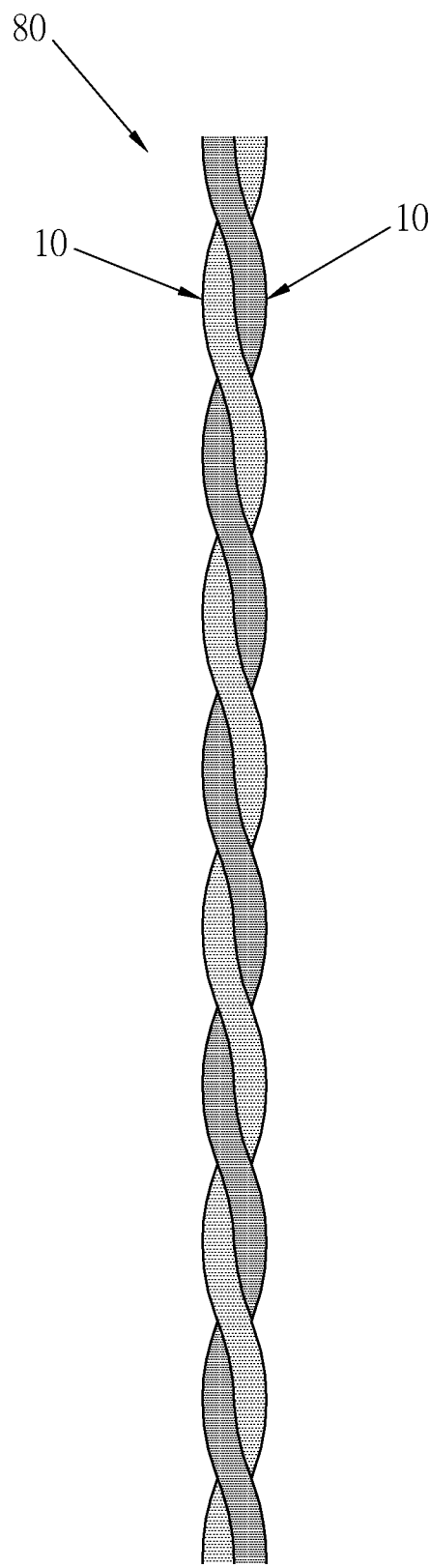
FIG. 30 is a schematic diagram of twisting the elastic filaments of the present invention into a thread.
Figure 31:
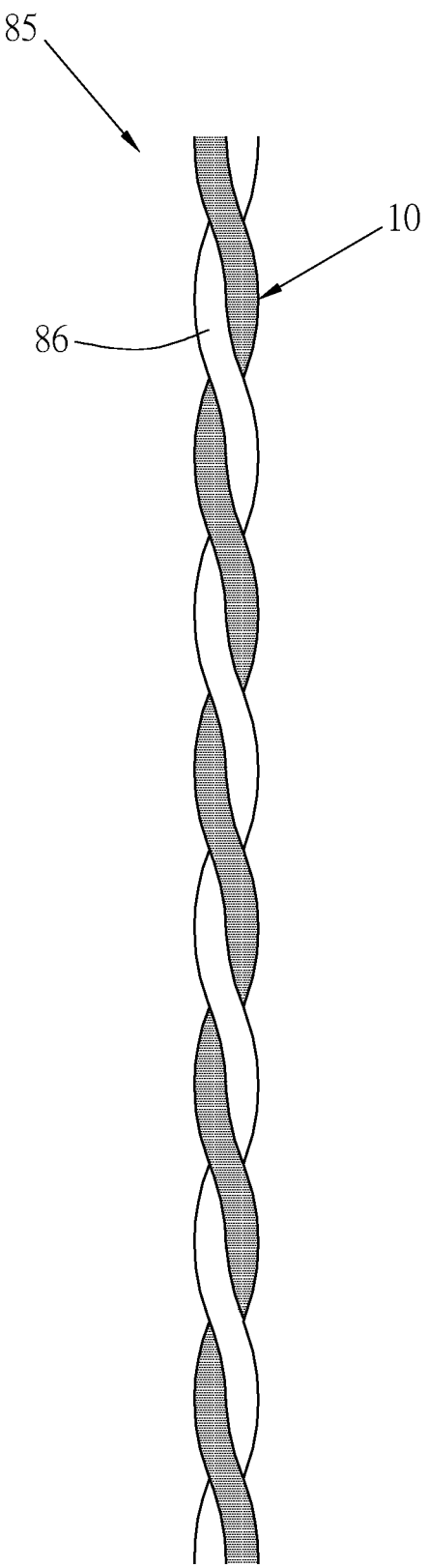
FIG. 31 is a schematic view of twisting the elastic filament of the present invention and another yarn into a thread.

Furthermore, please refer to FIG. 30, the present invention can twist two or more than two of the elastic filaments (represented by referenced number 10) selected from any one of the preferred embodiments disclosed above into a composite thread 80; or as shown in FIG. 31, one or more than one of the elastic filaments (represented by referenced number 10) of any one of the preferred embodiments of the present invention and at least one fiber 86 are twisted into a composite thread 85. By twisting into the composite threads 80, 85, rigidity, toughness and functionality of usage of the elastic filament can be enhanced. Techniques such as weaving and braiding can be performed by using the threads 80, 85.

It is to be understood that the above description is only preferred embodiments of the present invention and is not used to limit the present invention, and changes in accordance with the concepts of the present invention may be made without departing from the spirit of the present invention, for example, the equivalent effects produced by various transformations, variations, modifications and applications made to the configurations or arrangements shall still fall within the scope covered by the appended claims of the present invention.

What is claimed is:

1. An elastic filament, the elastic filament being a thin thread made of polymer material and having stretchable elasticity, the elastic filament being manufactured by cutting, a cross section of the elastic filament being rectangular, and a pair of opposite sides of the elastic filament being planes formed by cutting;

wherein the elastic filament has a successive length, and a width of the elastic filament is in a range of 0.09~3 mm;

wherein the elastic filament has a base layer made of polymer material and with stretchable elasticity; and at least one functional layer provided on at least one surface of the elastic filament, and the functional layer makes the elastic filament reflective, luminescent or conductive.

2. The elastic filament as claimed in claim 1, wherein the elastic filament has at least one luminescent layer capable of emitting luminescence and provided on at least one surface of the base layer.

3. The elastic filament as claimed in claim 2, wherein the luminescent layer has a plurality of microcapsule luminescent granules, each of the microcapsule luminescent granules has one luminescent particle or a plurality of luminescent particles and a coating layer, and the coating layer coats the luminescent particle or the luminescent particles.

4. The elastic filament as claimed in claim 3, wherein a material of the coating layer is resin.

5. The elastic filament as claimed in claim 3, wherein the coating layer is a resin capable of resisting potassium chloride.

6. The elastic filament as claimed in claim 2, wherein the base layer is mixed with a dye or pigment.

7. The elastic filament as claimed in claim 2, further comprising at least one color layer with a color, and the color layer being disposed on a surface of the base layer.

8. The elastic filament as claimed in claim 2, wherein a surface of the base layer has at least one color layer and at least one luminescent layer, and the luminescent layer is located on an outer side of the color layer.

9. The elastic filament as claimed in claim 3, wherein the luminescent layer is a mixture of the microcapsule luminescent granules and a resin.

10. The elastic filament as claimed in claim 1, wherein the elastic filament has at least one reflective layer to make the elastic filament capable of reflecting light.

11. The elastic filament as claimed in claim 10, wherein the elastic filament has two reflective layers and a bonding layer, and the bonding layer is located between the two reflective layers.

12. The elastic filament as claimed in claim 1, wherein the elastic filament is added with a metal powder.

13. The elastic filament as claimed in claim 12, wherein the metal powder is selected from aluminum, silver, gold, tin or copper, and a size of the metal powder is 5 μm to 100 μm.

14. The elastic filament as claimed in claim 1, wherein the elastic filament has at least one conductive slurry coating disposed on at least one surface of the base layer.

15. The elastic filament as claimed in claim 1, wherein a material of the base layer of the elastic filament is PU (Polyurethane), PVC (Polyvinyl Chloride), TPU (Thermoplastic Polyurethane Elastomer), TPE (Thermoplastic Elastomer), TPR (Thermoplastic Rubber), hot melt adhesive or silicone rubber.

16. The elastic filament as claimed in claim 1, wherein two or more than two of the elastic filaments are twisted into a thread; or at least one of the elastic filaments and at least one fiber are twisted into a thread.

* * * * *